(12) United States Patent
Kang et al.

(10) Patent No.: US 8,639,891 B2
(45) Date of Patent: Jan. 28, 2014

(54) METHOD OF OPERATING DATA STORAGE DEVICE AND DEVICE THEREOF

(75) Inventors: Mi Kyeong Kang, Hwasung-si (KR); Dong Jun Shin, Hwasung-si (KR); Shin-Ho Choi, Seoul (KR); Seong Jun Ahn, Seoul (KR); Min Cheol Kwon, Seoul (KR); Shine Kim, Suwon-si (KR); Sun-Mi Yoo, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 913 days.

(21) Appl. No.: 12/659,885

(22) Filed: Mar. 24, 2010

(65) Prior Publication Data

US 2010/0274976 A1 Oct. 28, 2010

(30) Foreign Application Priority Data

Apr. 24, 2009 (KR) .......................... 10-2009-0035962

(51) Int. Cl.
| | |
|---|---|
| G06F 12/00 | (2006.01) |
| G06F 12/06 | (2006.01) |
| G06F 13/00 | (2006.01) |
| G06F 13/28 | (2006.01) |
| G06F 9/26 | (2006.01) |
| G06F 9/34 | (2006.01) |

(52) U.S. Cl.
USPC .............................. 711/154; 711/5; 711/202

(58) Field of Classification Search
USPC ....... 711/5, 154, 202, 209, E12.001, E12.058
See application file for complete search history.

(56) References Cited

U.S. PATENT DOCUMENTS

2008/0140945 A1* 6/2008 Salessi et al. ................. 711/148

FOREIGN PATENT DOCUMENTS

| JP | 2000-357152 | 12/2000 |
|---|---|---|
| JP | 2007-317047 | 12/2007 |
| KR | 98-7144 | 3/1998 |
| KR | 1020070007264 | 1/2007 |
| KR | 100765786 | 10/2007 |

OTHER PUBLICATIONS

The Coq Proof Assistant, p. 8, http://coq.inria.fr/stdlib/Coq.ZArith.Zdiv.html.*
Abstract of Korean Publication No. 100215868 which corresponds to Korean Patent No. 98-7144, May 26, 1999.

* cited by examiner

*Primary Examiner* — Matthew Bradley
*Assistant Examiner* — Rocio Del Mar Perez-Velez
(74) *Attorney, Agent, or Firm* — Harness, Dickey & Pierce, P.L.C.

(57) ABSTRACT

The method of operating the data storage device includes performing channel distribution non-sequentially based on a logical address included in a data signal and outputting a channel address, and at least one of writing data to and reading stored data from a memory connected to one of a plurality of channels based on the channel address.

17 Claims, 6 Drawing Sheets

METHOD OF OPERATING DATA STORAGE DEVICE AND DEVICE THEREOF

CROSS-REFERENCE TO RELATED APPLICATION(S)

This application claims priority from Korean Patent Application No. 10-2009-0035962, filed on Apr. 24, 2009, in the Korean Intellectual Property Office (KIPO), the entire contents of which are incorporated herein by reference.

BACKGROUND

1. Field

Example embodiments of inventive concepts relate to a method of operating a data storage device and device thereof, for example, to a method of operating a data storage device, which may reduce or relieve a phenomenon where an overload occurs at a specific channel of the data storage device, and the device thereof.

2. Description of the Related Art

A Solid State Drive/Disk (SSD) includes a plurality of channels and a plurality of flash memories connected thereto. The plurality of flash memories may include a plurality of pages respectively, and the plurality of pages of a flash memory connected to a channel may have a fixed regulation and be assigned successively.

For example, the plurality of pages of a flash memory connected to a channel may have a page address increasing by a multiple of 4, respectively, and a plurality of pages of a flash memory connected to another channel may have a page address increasing by 1 plus a multiple of 4, respectively.

Thus, a plurality of pages of a flash memory connected to a channel may have a page address increasing by P0, P4, P8, P12, etc., respectively, and a plurality of pages of a flash memory connected to another channel may have a page address increasing by P1, P5, P9, P13, etc., respectively.

A conventional SSD may perform a write operation for writing a data signal output from a host on a page of a flash memory. Here, the SSD may perform an address mapping on a logical address value of a data signal supplied with a data signal by using a block mapping method and perform a write operation of the data signal in a page corresponding to a mapped value, e.g., a page address. However, since a method distributing each logical address value of a plurality of pages of a flash memory successively is used in a conventional SSD, there may be a phenomenon where an overload occurs at a specific channel during an input/output operation e.g., a read or a write operation, required from a host. Such an overload phenomenon at a specific channel reduces performance of the SSD.

SUMMARY

Example embodiments of general inventive concepts relate to a method of operating a data storage device, which may reduce an overload phenomenon at a specific channel and a data storage device performing the driving method.

According to example embodiments of general inventive concepts, a method for operating a data storage device includes performing channel distribution non-sequentially based on a logical address included in a data signal and outputting a channel address, and at least one of writing data to and reading stored data from a memory connected to one of a plurality of channels based on the channel address.

According to example embodiments of general inventive concepts, a data storage device includes a plurality of memories, a distribution unit, and a read/write module. The plurality of memories each connect to one of a plurality of channels. The distribution unit is configured to perform non-sequential channel distribution based on a logical address input from a host and configured to output a channel address. The read/write module is configured to perform address mapping on the logical address based on the channel address, and configured to write the data signal input from the host or read data stored in one of the plurality of memories connected to one of the plurality of channels designated by the channel address according to a mapping result.

BRIEF DESCRIPTION OF THE DRAWINGS

The above and other objects and features of example embodiments of general inventive concepts will become more apparent and readily appreciated from the following description of the embodiments, taken in conjunction with the accompanying drawings of which.

DETAILED DESCRIPTION

Figure 1:
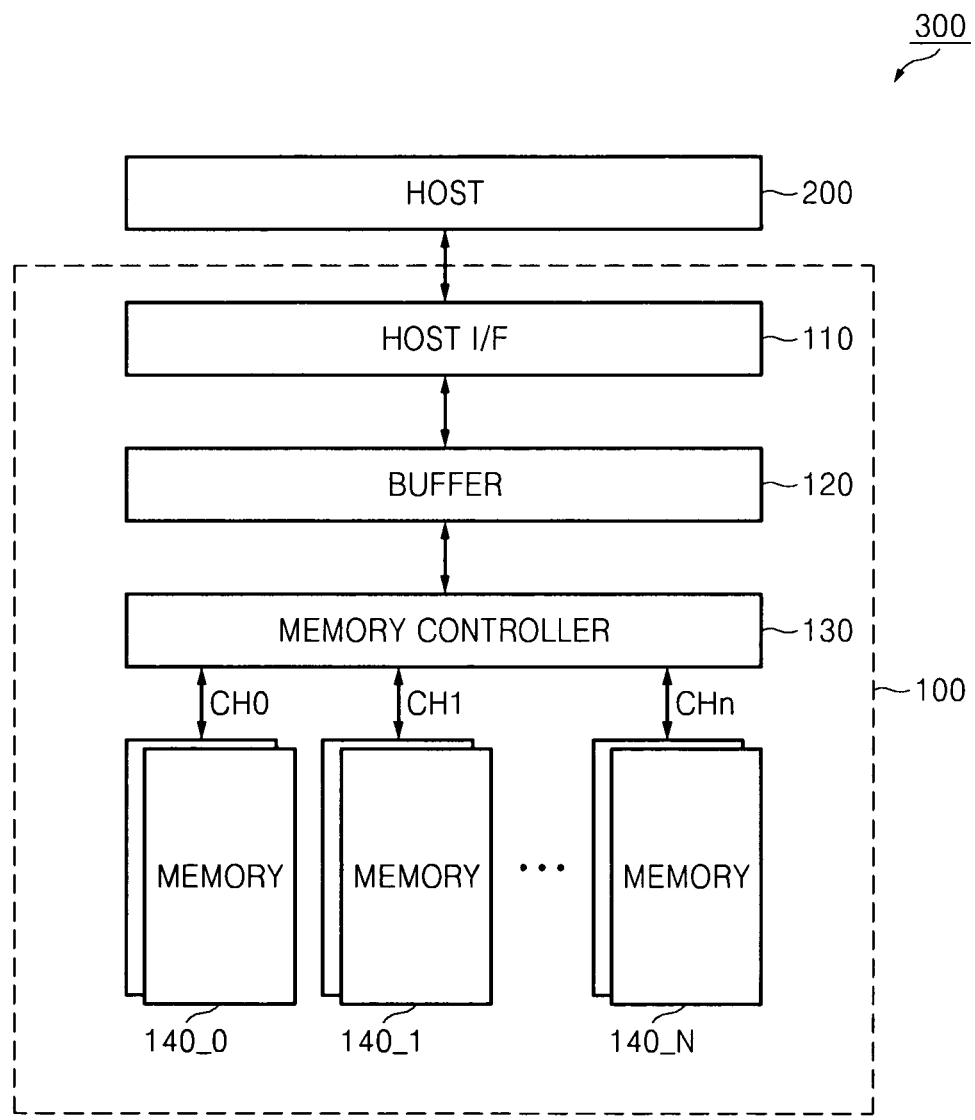
FIG. 1 is a schematic block diagram of a data storage system including a data storage device according to example embodiments of general inventive concepts.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures. The figures are intended to depict example embodiments and should not be interpreted to limit the intended scope of the claims. The accompanying figures are not to be considered as drawn to scale unless explicitly noted.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof. In this specification, the term "and/or" picks out each individual item as well as all combinations of them.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

When it is determined that a detailed description related to a related known function or configuration may make the purpose of example embodiments unnecessarily ambiguous, the detailed description thereof will be omitted. Also, terms used herein are defined to appropriately describe example embodiments and thus may be changed depending on a user, the intent of an operator, or a custom. Accordingly, the terms must be defined based on the following overall description within this specification.

Reference will now be made in detail to example embodiments of general inventive concepts, examples of which are illustrated in the accompanying drawings, wherein like reference numerals refer to the like elements throughout. The embodiments are described below in order to explain general inventive concepts by referring to the figures.

The data storage device according to example embodiments of general inventive concepts may be used for data storage in various fields such as a computer system, a terminal device system, an input/output device system, a hard disk (HDD) recorder, a personal terminal such as a cellular phone or a PDA, a portable computer, navigation device, home automation system, a camcorder, a video player, a storage server, a portable multimedia player (PMP), a card system including a Solid State Drive/Disk (SSD) or a smart card. The following explains an example that the data storage device is used as a SSD among the above-mentioned various fields for an ease of explanation.

Figure 2:
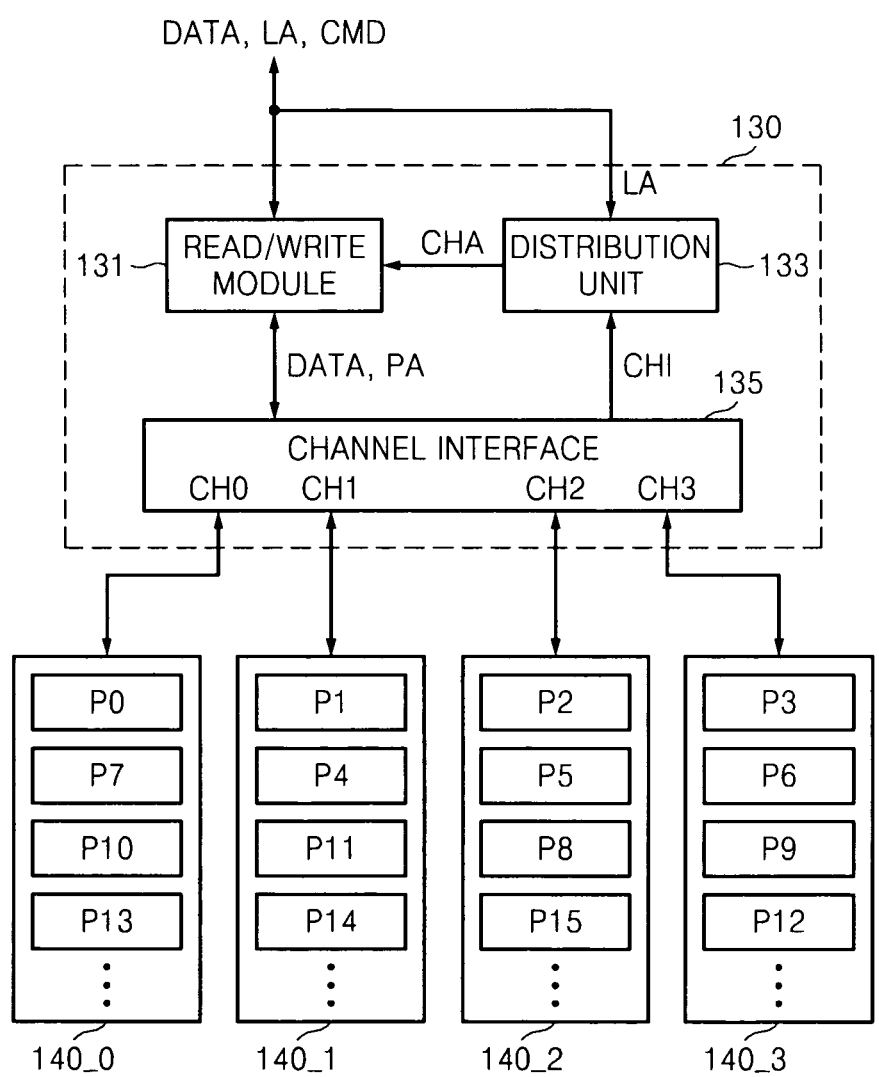
FIG. 2 is a schematic block diagram of a memory controller of the data storage device illustrated in FIG. 1.

FIG. 1 is a schematic block diagram of a data storage system including a data storage device according to example embodiments of general inventive concepts, and FIG. 2 is a schematic block diagram of a memory controller of the data storage device illustrated in FIG. 1.

Referring to FIGS. 1 and 2, a data storage system 300 may include a host 200 and a data storage device 100.

The host 200 may be a file system. It may provide the data storage device 100 with a data signal DATA to be written or be provided with data read from the data storage device 100. The host 200 may output the data signal DATA or a logical address LA to the data storage device 100 with a command signal CMD. For example, the host 200 may output a write command signal for performing, by the data storage device 100, a write operation with the data signal DATA and a logical address LA of the data signal DATA to the data storage device 100. The host 200 may also output a read command signal for performing, by the data storage device 100, a read operation with a logical address LA of a data, which is to be read, to the data storage device 100.

The data storage device 100 may store a data signal DATA input from the host 200 or output stored data to the host 200.

The data storage device 100 may include a host interface 110, a buffer 120, a memory controller 130 and a plurality of memories 140_1 to 140_N.

The host interface 110 may be given a data signal DATA and supply it to the buffer 120 while communicating with the host 200, or provided with data stored in the plurality of memories 140_0 to 140_N through the controller 130 and the buffer 120 and output the data to the host 200. The buffer 120 may temporarily store the data signal DATA input through the host interface 110 or temporarily store data input from the plurality of memories 140_0 to 140_N through the memory controller 130.

The memory controller 130 may include a plurality of channels, e.g., a 0 channel (CH0) to an N channel (CHn). In example embodiments of general inventive concepts, an example memory controller 130 is shown to include four channels CH0 to CH3 with a memory is connected to each of the channels CH0 to CH3, for an ease of explanation. However, example embodiments of general inventive concepts are not limited thereto and may include various numbers of channels and/or memories.

The memory controller 130 may write a data signal DATA, supplied from the host 200, in one of a plurality of memories 140_0 to 140_N, connected to each of the channels CH0 to CH3, or read data stored in one of the plurality of memories 140_0 to 140_N connected to each of the channels CH0 to CH3.

For example, when the host 200 outputs a data signal DATA, a corresponding logical address LA and a write command signal, the memory controller 130 may select a channel where the data signal DATA is to be written in response to the logical address LA and a page address, e.g., a physical address PA, of a memory connected to the selected channel.

The memory controller 130 may write a data signal DATA in a page of a memory selected according to the physical address PA.

In addition, when the host 200 outputs a logical address LA and a read command signal, the memory controller 130 may output a physical address PA where data to be read is stored in response to the logical address LA. The memory controller 130 may read data from a page of a memory selected according to the physical address PA.

The memory controller 130 may include a read/write module 131, a distribution unit 133 and a channel interface 135.

The read/write module 131 may perform a write operation of a data signal DATA supplied from the host 200 or read data stored in a plurality of memories 140_0 to 140_3 according to a command signal CMD input from the host 200.

For example, when a write command signal is input to the read/write module 131 from the host 200 through the host interface 110, the read/write module 131 may perform a write operation for writing a data signal DATA input with the write command signal to one of a plurality of memories 140_0 to 140_3. Here, the read/write module 131 may perform an address mapping on a logical address LA input with the data signal from the host 200 based on a channel address CHA supplied from the distribution unit 133, which is further described below, and output a physical address PA including a channel address CHA and a page address as a result of the address mapping.

The channel interface 135 may write a data signal DATA in a page of a memory corresponding to a physical address PA.

Additionally, when a read command signal is input to the read/write module 131 from the host 200, the read/write module 131 may perform a read operation for reading data stored in one of the plurality of memories 140_0 to 140_3 according to a logical address LA input with the read command signal. Here, the read/write module 131 may perform an address mapping on the logical address LA input from the host 200 based on a channel address CHA supplied from the distribution unit 133, and output a physical address PA including the channel address CHA and a page address as a result of the address mapping.

The channel interface 135 may read data from a page in a memory corresponding to a physical address PA. Here, the read/write module 131 may perform an address mapping in a block mapping method. However, example embodiments of general inventive concepts are not restricted to block mapping methods and may include other address mapping methods as well. For example, the read/write module 131 may perform an address mapping by using one of a block mapping method, a page mapping method and a hybrid mapping method.

The distribution unit 133 may output a channel address CHA from a logical address LA input from the host 200. For example, the distribution unit 133 may be provided with channel information CHI from the channel interface 135, distribute the received logical address LA by using a non-sequential channel distribution method and output a channel address CHA according to a distribution result.

For example, the distribution unit 133 may distribute a logical address LA to each channel according to an equation 1 below.

$$CHA = [LA + (LA/CHI)]\%CHI \qquad \text{Equation 1}$$

Here, CHA is a channel address, LA is a logical address and CHI is channel information. An operator % may be referred to as modulo and may output a remainder of a division operation. The channel information may also include the total number of channels of the data storage device 100 and an operational result of (LA/CHI) of the equation 1 may be an integer.

The channel interface 135 may be connected to a plurality of memories 140_0 to 140_3 through a plurality of channels CH0 to CH3. The channel interface 135 may write a data signal DATA supplied from the read/write module 131 in a page of a memory connected to a channel corresponding to a mapped physical address PA. The channel interface 135 may also read stored data from a page of a memory connected to a channel corresponding to a physical address PA supplied from the read/write module 131. Read data may be output to the read/write module 131. The channel interface 135 may output channel information CHI, e.g., channel information CHI on the total number of channels, to the distribution unit 133.

A plurality of memories 140_0 to 140_3 may be connected to each of a plurality of channels CH0 to CH3 of the memory controller 130, respectively. For example, a first memory 140_0 may be connected to a first channel CH0, a second memory 140_1 may be connected to a second channel CH1, a third memory 140_2 may be connected to a third channel CH2 and a fourth memory 140_3 may be connected to a fourth channel CH3.

The first through fourth memories 140_0 to 140_3 may include a plurality of pages P0 to P15, respectively. The plurality of pages P0 to P15 may be designated by each page address, respectively.

Figure 3:
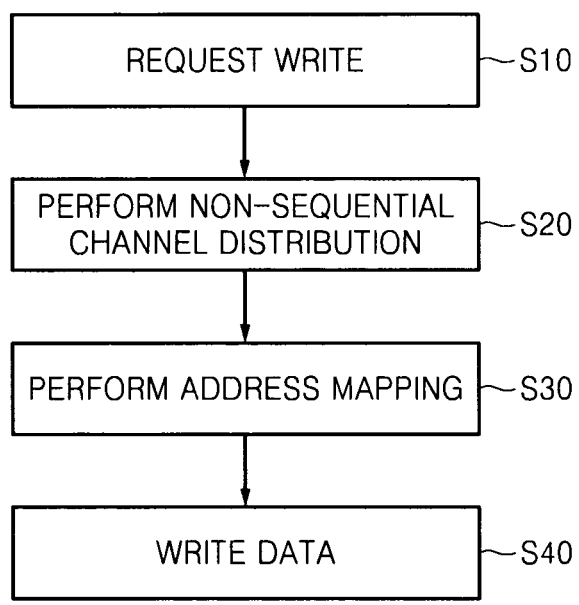
FIG. 3 is a flowchart of an example of a write operation of the data storage system illustrated in FIG. 1.
Figure 4:
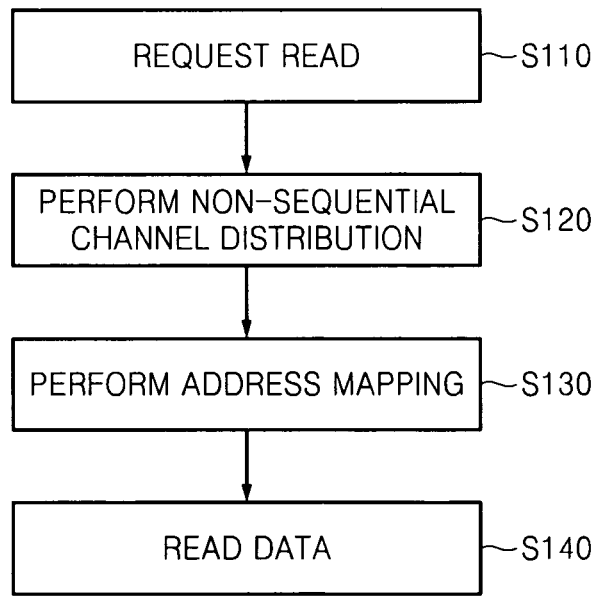
FIG. 4 is a flowchart of an example of a read operation of the data storage system illustrated in FIG. 1.

The following explains an operation of a data storage system described above referring to FIGS. 3 and 4. FIG. 3 is a flowchart of a write operation of the data storage system illustrated in FIG. 1 and FIG. 4 is a flowchart of a read operation of the data storage system illustrated in FIG. 1.

Referring to FIGS. 1 to 3, a data signal DATA, a logical address LA and a write command signal may be input to the host interface 110 of the data storage device 100 from the host 200, at S10. The memory controller 130 may operate in a write operation mode in response to a write command signal supplied through the host interface 110 and the buffer 120. For example, a write command signal may be input to the read/write module 131 of the memory controller 130, and the read/write module 131 may operate in a write operation mode for writing a data signal DATA in one of a plurality of memories 140_0 to 140_3.

The distribution unit 133 may perform non-sequential channel distribution on a logical address LA supplied through the host interface 110 and the buffer 120 by using a non-sequential channel distribution method, e.g., equation 1, and output a channel address CHA thereof, at S20. For example, when a logical address LA of a data signal DATA supplied with a data signal DATA from the host 200 is 4, the distribution unit 133 may derive a channel address CHA, e.g., 1, where a data signal is output as below by using the equation 1.

Thus, using equation 1, the channel address CHA may be calculated as CHA=[4+(4/4)]%4=1.

For example, a data signal DATA supplied with a logical address LA of 4 from the host 200 may be written in a first memory 140_1 connected to a channel address CHA of 1, e.g., the second channel CH1.

On the other hand, in a conventional data storage device, when a logical address LA of 4 is input, a path may be designated so that a data signal DATA is written in the first memory 140_0 through the first channel CH0, which is distributed successively according to a fixed regulation. However, since the distribution unit 133 performs non-sequential channel distribution on a logical address LA of 4 in the data storage device 100 of example embodiments of general inventive concepts, a path may be designated so that a data signal DATA to be written in a first memory 140_1 is shifted to a channel neighboring the first channel CH0, e.g., the second channel CH1.

A channel address CHA output from the distribution unit 133 may be supplied to the read/write module 131 and the read/write module 131 may perform an address mapping operation of a logical address LA based on the channel address CHA, at S30. Here, the read/write module 131 may perform an address mapping operation by using a block mapping method.

The read/write module 131 may output a physical address PA, which includes a channel address CHA and a page address, with a data signal DATA together as a result of the address mapping operation. Here, although not illustrated in a drawing, the read/write module 131 may further store the physical address PA including a channel address CHA and a page address in a memory (not shown).

The channel interface 135 may write a data signal DATA in a page P4 designated by a page address included in a page of a second memory 140_1, e.g., a physical address PA, connected to a second channel CH1 based on a physical address supplied from the read/write module 131, at S40.

On the other hand, referring to FIG. 2, each page P0 to P15 of a plurality of memories 140_0 to 140_3 may be designated by a page address, which has a fixed regulation through non-sequential channel distribution by the distribution unit 133.

For example, a plurality of pages of the first memory 140_0 may increase by P0, P7, P10, P13, etc. through channel distribution by the distribution unit 133, respectively and a plurality of pages of the second memory 140_1 may increase by P1, P4, P11, P14, etc., respectively. Moreover, a plurality of pages of the third memory 140_2 may increase by P2, P5, P8, P15, etc., respectively and a plurality of pages of the fourth memory 140_3 may increase by P3, P6, P9, P12, etc., respectively.

For example, according to non-sequential channel distribution by the distribution unit 133 in the data storage device 100 of example embodiments of general inventive concepts, each page of a plurality of memories 140_0-140_3 may have a page address whose odd page address and even page address increase by turn.

Referring to FIGS. 1, 2 and 4, a logical address LA and a read command signal may be input to the host interface 110 of the data storage device 100 from the host 200, at S110. The memory controller 130 may operate in a read operation mode in response to the read command signal supplied through the host interface 110 and the buffer 120. For example, the read command signal may be input to the read/write module 131 of the memory controller 130 and the read/write module 131 may operate in a read operation mode for reading data stored in one of a plurality of memories 140_0 to 140_3 in response to the read command signal.

The distribution unit 133 may perform non-sequential channel distribution on a logical address LA supplied through the host interface 110 and the buffer 120 by using a non-sequential channel distribution method, e.g., the above-mentioned equation 1, and output a channel address CHA thereof, at S120. For example, when a logical address LA supplied from the host 200 is 4, the distribution unit 133 may derive a channel address CHA of data to be read as below, e.g., 1, by using the equation 1.

Thus, using equation 1, the channel address CHA may be calculated as CHA=[4+(4/4)]%4=1.

Thus, a logical address LA of 4 output to read data from the data storage device 100 may be data stored in a second memory 140_1 connected to a second channel CH1.

A channel address CHA output from the distribution unit 133 may be supplied to the read/write module 131 and the read/write module 131 may perform an address mapping operation of a logical address LA based on the channel address CHA, at S130. The read/write module 131 may output a physical address PA including the channel address CHA and a page address as a result of the address mapping operation. The channel interface 135 may read stored data from a page of a second memory 140_1 connected to a second channel CH1, e.g., a page P4 designated by a page address included in a physical address PA, based on the physical address PA supplied from the read/write module 131 (S140).

On the other hand, in example embodiments of general inventive concepts, a read operation of data is explained with an example that the distribution unit 133 outputs a channel address CHA by performing channel distribution on a logical address LA in a non-sequential channel distribution mode. However, example embodiments of general inventive concepts are not restricted thereto.

For example, when the data storage device 100 performs a write operation of a data signal DATA, it may store a channel address CHA, which distributes a logical address LA in a non-sequential channel distribution method. Accordingly, when the data storage device 100 performs a read operation of data, the distribution unit 133 may not perform a non-sequential channel distribution on a logical address LA but read data from a page of a memory connected to a corresponding channel referring to the channel address CHA stored in advance.

Figure 5A:
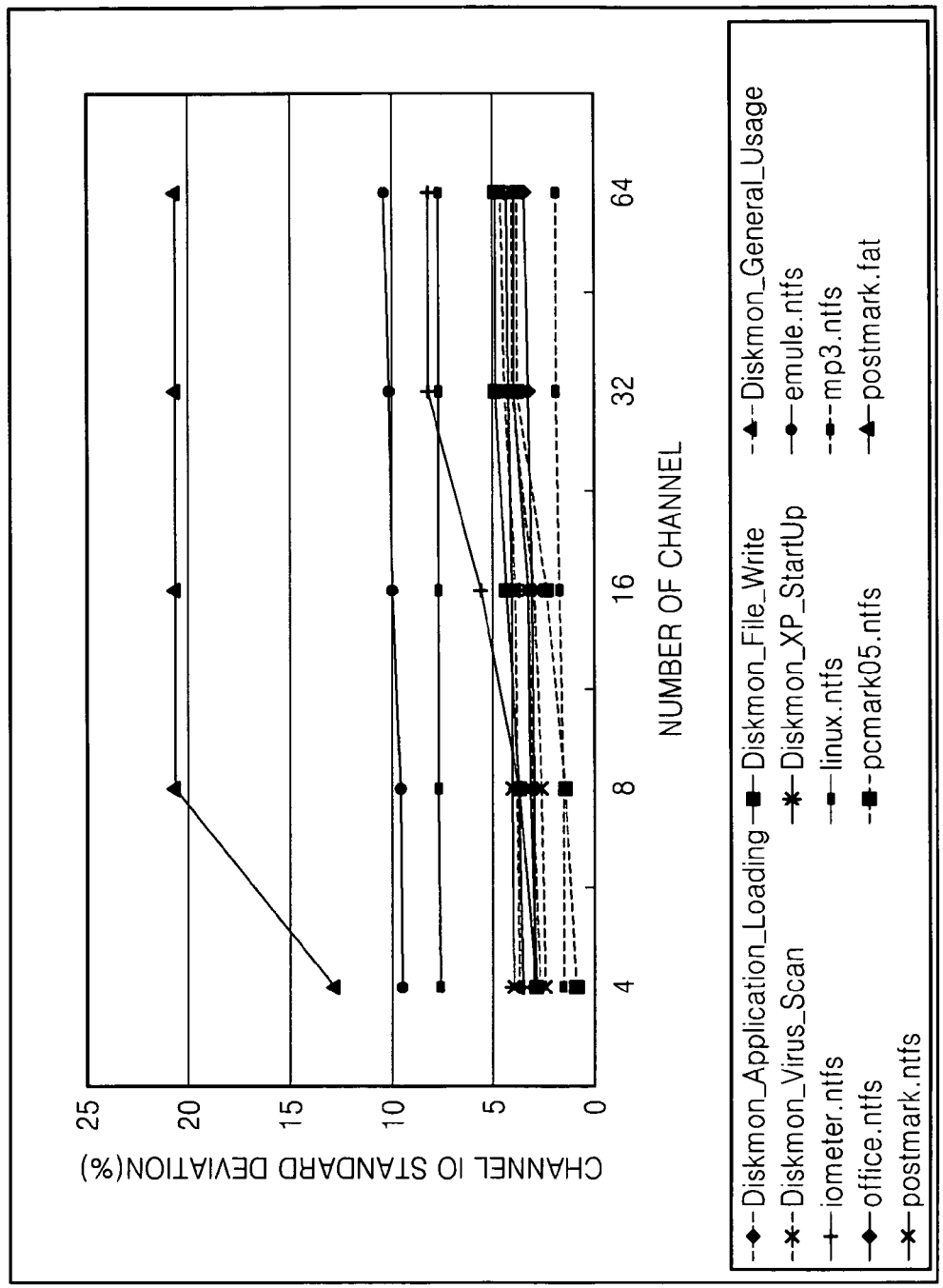
FIG. 5A is a drawing showing a deviation by channel for a read/write operation of a conventional data storage device.
Figure 5B:
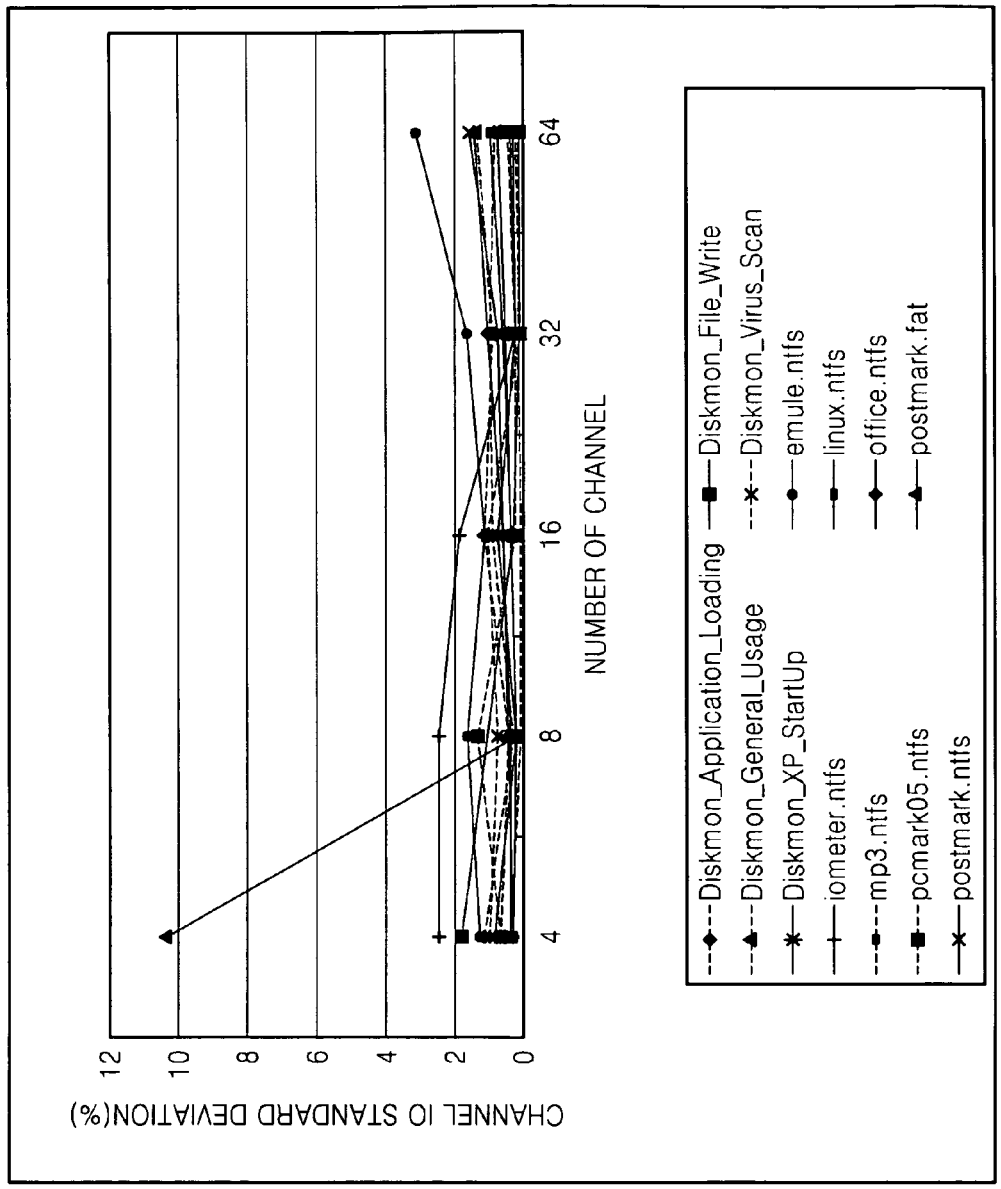
FIG. 5B is a drawing showing a deviation by channel for a read/write operation of a data storage device according to example embodiments of general inventive concepts.

FIG. 5A is a drawing showing deviation by channel for a read/write operation of a conventional data storage device and FIG. 5B is a drawing showing deviation by channel for a read/write operation of a data storage device according to example embodiments of general inventive concepts.

Referring to FIGS. 5A and 5B, while a read/write operation of a conventional data storage device, since a memory controller distributes a channel successively, has deviation by channel approx. from 1% to 20%, a read/write operation of a data storage device of example embodiments of general inventive concepts, since a distribution unit (e.g. 133 in FIG. 2) distributes a channel non-sequentially, may have deviation by channel below 3%. Thus, a data storage device of example embodiments of general inventive concepts may reduce or relieve a phenomenon that an overload occurs at a specific channel due to unequal distribution of access at a specific channel while performing a read/write operation.

A method for driving of a data storage device according to example embodiments of general inventive concepts and a data storage device thereof, by distributing a plurality of pages of a data storage device using a non-sequential channel distribution algorithm, may reduce a phenomenon that an overload occurs at a specific channel of a data storage device by not allowing a fixed pattern of page address to be distributed at a channel, and improve performance of a data storage device accordingly.

Although example embodiments of general inventive concepts have been shown and described, it will be appreciated by those skilled in the art that changes may be made in these embodiments without departing from the principles and spirit of general inventive concepts, the scope of which is defined in the appended claims and their equivalents.

What is claimed is:
1. A method for operating a data storage device comprising:
    performing channel distribution non-sequentially based on a logical address included in a data signal and outputting a channel address; and at least one of writing data to or reading stored data from a memory connected to one of a plurality of channels based on the channel address, wherein the performing generates and outputs the channel address according to the following equation $$CHA=[LA+(LA/CHI)]\%CHI,$$

where, CHA is the channel address, LA is the logical address, CHI is channel information and % is a modulo operator outputting a remainder of a division operation, LA is integer multiples of CHI.

2. The method of claim 1, wherein the at least one writing data to or reading stored data from includes writing the data included in the data signal to the memory connected to one of the plurality of channels based on the channel address.

3. The method of claim 2, further comprising:
outputting a physical address including the channel address by performing address mapping on the logical address according to a block mapping based on the channel address after the performing outputs the channel address.

4. The method of claim 3, further comprising:
storing the physical address including the channel address in order to refer to the physical address during a data read operation performed after writing the data signal.

5. The method of claim 4, wherein the data read operation is performed in response to an externally received read command signal.

6. The method of claim 3 wherein the physical address further includes a page address indicating one of a plurality of pages of the memory.

7. The method of claim 6, wherein
each of the channels connect to a separate group of pages, and
the page addresses of each of the group pages increment non-sequentially.

8. The method of claim 2, wherein the writing writes the data in response to an externally received write command signal.

9. The method of claim 1, wherein the channel information includes a total number of channels of the data storage device.

10. The method of claim 1, wherein the at least one writing data to or reading stored data from includes reading the stored data from the memory connected to the channel designated by the channel address among the plurality of channels.

11. The method of claim 10, wherein the channel information includes a total number of channels of the data storage device.

12. The method of claim 10, further comprising:
outputting a physical address including the channel address by performing address mapping on the logical address according to a block mapping based on the channel address after the performing outputs the channel address.

13. The method of claim 12, wherein the physical address further includes a page address indicating one of a plurality of pages of the memory.

14. The method of claim 13, wherein
each of the channels connect to a separate group of pages, and
the page addresses of each of the group pages increment non-sequentially.

15. The method of claim 10, wherein the reading reads the stored data in response to an externally received read command signal.

16. A data storage device comprising:
a plurality of memories each connected to one of a plurality of channels;
a distributor configured to perform a non-sequential channel distribution function based on a logical address input from a host and configured to output a channel address; and
a read/write module configured to perform address mapping on the logical address based on the channel address, and configured to write the data signal input from the host or read data stored in one of the plurality of memories connected to one of the plurality of channels designated by the channel address according to a mapping result, wherein the function is the following equation $$CHA=[LA+(LA/CHI)]\%CHI,$$

where CHA is the channel address, LA is the logical address, CHI is the channel information and % is a modulo operator outputting a remainder of a division operation.

17. The data storage device of claim 16, wherein the channel information includes a total number of channels of the data storage device.

* * * * *